United States Patent [19]

Campbell

[11] 4,384,211
[45] May 17, 1983

[54] ALUMINUM CYCLE ENERGY SYSTEM

[76] Inventor: Berry Campbell, 444 N. Alta Vista, Monrovia, Calif. 91016

[21] Appl. No.: 213,978

[22] Filed: Dec. 8, 1980

[51] Int. Cl.³ .............................................. H01M 8/20
[52] U.S. Cl. ...................................... 290/1 R; 429/17
[58] Field of Search .......................... 429/17; 290/1 R

[56] References Cited

U.S. PATENT DOCUMENTS 2,036,613  4/1936  Stuart ................................. 290/1 R
4,150,197  4/1979  Zaromb ................................ 429/17

Primary Examiner—J. V. Truhe
Assistant Examiner—Shelley Wade
Attorney, Agent, or Firm—Nilsson, Robbins, Dalgarn, Berliner, Carson & Wurst

[57] ABSTRACT

A closed-loop process is disclosed for managing electrical energy in displaced time and space by utilizing aluminum in an oxidation-reduction cycle. Metallic aluminum, in a substantially pure electrolytic form, is burned to provide substantial quantities of heat for use by any of a wide variety of heat engines to in turn generate electrical energy. For example, the heat of combustion from the aluminum may drive a turbine to generate electrical energy. In addition to heat, combustion of the aluminum produces aluminum oxides which as disclosed herein (at a convenient time and place) receive energy for reduction back into the metallic form of aluminum. The chloride-reduction process is disclosed. The metallic aluminum is thus again in an effective form for storage and movement of energy pursuant to combustion and another cycle.

8 Claims, 2 Drawing Figures

ALUMINUM CYCLE ENERGY SYSTEM

BACKGROUND AND SUMMARY OF THE INVENTION

Meeting the energy demands of industrialized societies has become progressively more difficult in recent years. Planning based on recognizing the inevitable depletion of traditional energy sources has encountered complications severely limiting the use of certain sources of energy. For example, in concentrated population areas the combustion of fossil fuels with relatively high sulphur contents has been prohibited on the basis of determinations that such fuels severely contaminate the air. As a related consideration, the construction of nuclear facilities has been vigorously opposed not only in the proximity of population centers and watersheds but even in some adjacent wilderness areas. Thus, both traditional and nuclear electrical generating facilities tend to be viewed as threats to the surrounding area that are potentially harmful to the environment.

It has been recognized that perhaps either nuclear generating facilities or fossil fuel-burning facilities for the generation of electrical energy could be located remotely from population areas of energy demand. However, it has long been recognized with regard to hydroelectric facilities that transporting electrical energy from one location to another is expensive both in terms of initial investment and continuing costs. The same problems arises in remotely locating nuclear or fossil fuel-generating facilities. Consequently, in the worldwide distribution of energy, vast quantities of hydrocarbon fuel are variously transported, stored, and refined. Some fuels are marginally economic for certain uses in view of impurities. While hydrocarbons are stored or transported in a liquid form, they pose a continuing threat of contamination. Specifically, oil spills (both on land and sea) have caused considerable environmental damage.

In view of the above considerations, it may be seen that a substantial need exists for an improved process that would enable safer management of energy. Specifically, a need exists for a practical and economic system for storing and transporting energy to accomplish desired distribution. The need is for a system that would allow the safe use of various energy sources and the economic provision of large amounts of energy in concentrated population centers, without substantial pollution or threat to the environment.

In general, the present invention is directed to a process that utilizes aluminum as a working medium, for managing electrical energy to accomodate displacements of time and space. Somewhat more specifically, the process as disclosed herein contemplates the combustion of a metallic electrolytically-produced aluminum to provide heat and aluminum oxide. The heat of such relatively clean combustion is converted into electrical energy. The aluminum oxide from the combustion is transported to a safe reduction site where it is electrolytically reduced again to metallic aluminum by the utilization, for example, of: fossil fuel, a nuclear reactor, or a hydroelectric generator. Note that the reduction site for the aluminum would be selected for safe operation and could be in the proximity of: fossil fuel deposits, a hydroelectric generator, or a nuclear reactor.

In a metallic form, the aluminum is durable, safe, clean, and convenient to transport and store. Also, the combustion of aluminum (particularly in a controlled environment) avoids substantial pollution.

BRIEF DESCRIPTION OF THE DRAWINGS

In the drawings, which constitute a part of this specification, an exemplary embodiment demonstrating various objectives and features hereof is set forth as follows.

DESCRIPTION OF AN ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specific structural and functional details disclosed herein are merely representative, yet in that regard they are deemed to provide the best embodiment for purposes of disclosure and to provide a basis for the claims herein which define the scope of the present invention.

Figure 1:
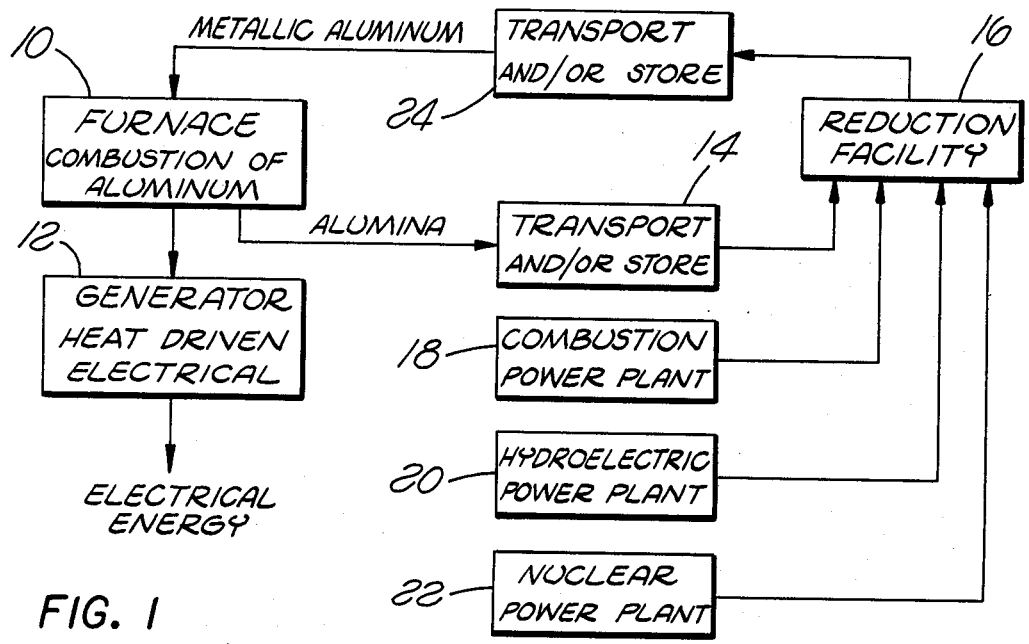
FIG. 1 is a flow diagram illustrating the closed-loop process of the present invention.

Referring initially to FIG. 1, a furnace for the combustion of aluminum is represented by a block 10 (upper left). As disclosed in greater detail below, the furnace 10 receives metallic aluminum which is burned to produce alumina and heat. The heat of combustion from the furnace 10 is supplied to a generator 12 for conversion into electrical energy.

The alumina from the furnace 10 may be variously transported or stored as indicated by the block 14 to be received in due course at a reduction facility 16. Electrical energy is provided to the reduction facility 16 as illustratively depicted from any of: a combustion power plant 18, a hydroelectric power plant 20, and/or a nuclear power plant 22. The energy received at the reduction facility is employed to electrolytically reduce the received alumina to a metallic form of aluminum which is returned to the furnace 10, after transportation or storage as represented by the block 24. The system of the present invention thus may be seen to comprise a closed-loop process facilitating the management of energy by using aluminum as a working medium for managing electrical energy in displaced time or space. A number of specific examples will further illustrate the system.

Referring to FIG. 1, the nuclear power plant 22 may be located in a select desolate area unlikely to impact on important population or environmental areas. In such a case, the reduction facility 16 would be located nearby so that vast quantities of electrical energy could be provided for the reduction of the alumina to produce metallic aluminum. The reduction facility 16 might take a variety of different forms, one of which is treated in some detail below.

Pursuing the present example, metallic aluminum from the reduction facility 16 could be variously stored in its high-energy state as represented by the block 24. Of course, the aluminum might take any of a variety of physical forms convenient for storage or transportation. In one form, the aluminum might be as ingots for convenient storage handling and shipment. Alternatively, the aluminum might be provided from the reduction facility 16 in either a powdered or pellet form for shipment to the furnace 10. Note that the characteristic of aluminum to form a protective film of oxide at its surface enables exceedingly longtime storage. Consequently, aluminum in ingots could be stored in many locations without danger or deterioration. Specifically, storage could be underground, under water, or otherwise exposed to existing environments.

Pursuing the illustrative example, the furnace 10 might be located in a population center with large energy demands. As indicated above, the heat of combustion from the furnace 10 is converted into electrical energy. A significant consideration resides in the cleanliness of that combustion. Of course, if the aluminum is burned in air, some pollutants may be produced; however, controls are possible as such pollutants are not inherent in the fuel and contaminants may be avoided for the environment at the critical location. For example, the aluminum can be burned in oxygen.

Pursuing other examples of the present invention as illustrated in FIG. 1, the combustion power plant 18 might be located (along with the reduction facility 16) in an area bearing fossil fuel and/or an area where products of hydrocarbon combustion are effectively dispersed for neutralization. Such an area might well tolerate the combustion of problem fossil fuels, as those with a high sulphur content for example without any significant detrimental effects to the environment. Again, the energy from such combustion would be utilized by the reduction facility 16 to electrolytically convert cycled alumina back to metallic aluminum for subsequent combustion in the furnace 10.

Considering the third exemplary possibility as illustrated in FIG. 1, the hydroelectric power plant 20 affords a significant advantage for the utilization of the process of the present invention in driving the reduction facility 16 during off-peak electrical loads. That is, the hydroelectric power plant 20 (at a natural location) may be operated at peak load during substantially all intervals by utilizing energy in excess of the demand load to reduce alumina to metallic aluminum in the reduction facility 16.

It may therefore be seen that the system or process of the present invention may be variously implemented to manage and store energy. In general, the process is characterized by a closed-loop cycle involving electrolytically produced aluminum. In that regard, various techniques have been employed for the combustion of aluminum, particularly in a powered form. The metal melts at 650° C. and burns vigorously in air at a slightly higher temperature. Combustion can be initiated with magnesium as a starter. The energy derived from aluminum combustion is primarily in the form of heat and is approximately 8,000 kilowatt hours per ton of substantially pure aluminum. Of course, a variety of furnaces might be utilized as the furnace 10 and in that regard, certain techniques utilizing the combustion of various fuels appear rather promising.

Considering the reduction facility 16, a variety of equipments might be employed as previously used to refine metallic aluminum. In that regard generally, it is common practice to process bauxite (or other clays) to provide a purified form of aluminum oxide (alumina). Such alumina may then be reduced to metallic aluminum using any of a variety of processes including the well known Herriot process.

To consider an exemplary form for the reduction facility 16, reference will now be made to the so-called aluminum chloride process. That process has been determined to be particularly efficient in converting alumina into metallic aluminum. However, a recognized difficulty with the process has been that silicon (along with some other contaminants) is carried into the metallic aluminum. In utilizing the aluminum chloride process in the present invention, the closed-loop alumina does not contain the silicon. That is, the medium is initially refined to a relatively pure form. Consequently, when the purified alumina is reduced to metallic aluminum, essentially pure aluminum metal is the result so that the disadvantage normally attendant the chloride-reduction process is not of particular concern. By using the aluminum chloride reduction process as a step in the system of the present invention, relatively good efficiencies may be attained.

Figure 2:
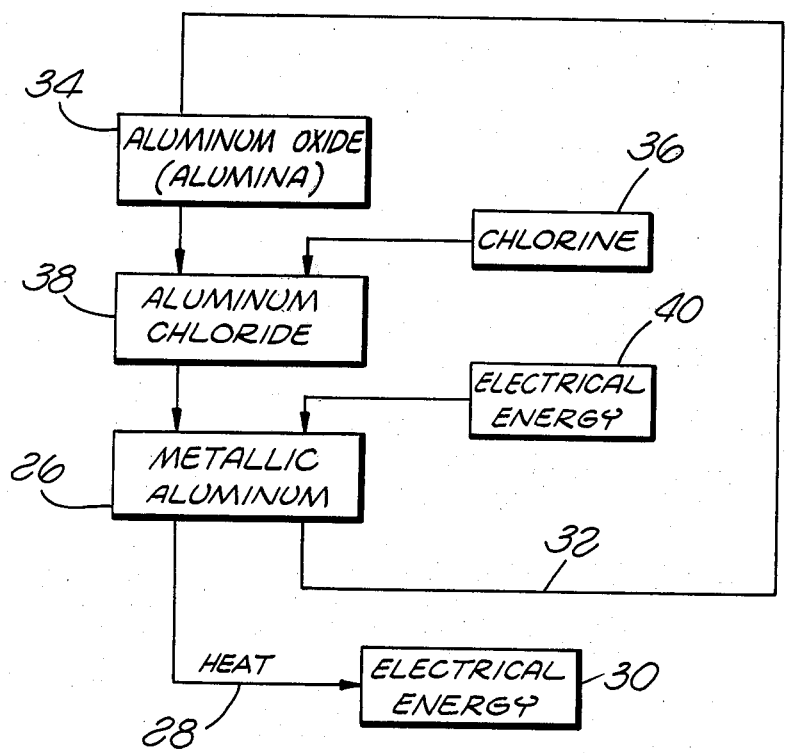
FIG. 2 is a flow diagram indicating a specific form of substance transformations attendant an exemplary form of the process of the present invention.

Considering the cycle for the aluminum working medium in the process of the present invention, reference will now be made to FIG. 2. As indicated above, the aluminum process is a closed-loop cycle with the consequence that explanation might be initiated at any stage. However, in view of the familiarity of the substance, it may be appropriate to begin the explanation with aluminum in a substantially pure metallic state as represented by block 26. The aluminum metal is ignited for combustion to produce heat as indicated by the line 28 which is converted to electrical energy as indicated by the block 30. The combustion of the metallic aluminum also produces aluminum oxide (alumina) as indicated by the line 32 and as represented by the state block 34.

The aluminum oxide at that state is substantially pure with relatively no silicon or significant other metallic contaminants. The reduction process for the oxide involves the addition of chlorine, as represented by the block 36 to provide aluminum chloride as represented by the block 38. The aluminum chloride is then reduced by electrolysis to accomplish substantially pure metallic aluminum by the addition of electrical energy as represented by the block 40.

As suggested above, the aluminum chloride reduction method is desirable in relation to alternative electrolytic methods in view of the reduced energy requirements attendant the process. As indicated, the prior difficulty of the process in reducing bauxite or other natural aluminum oxides to metallic aluminum has been the impurities produced in the resulting metal. Specifically, for example, alloys with silica contents in excess of twenty percent have been produced. However, in the cycle of the present invention, the aluminum oxide (block 34) is substantially pure (i.e. relatively free of silicon) with the result that the aluminum chloride reduction method accomplishes a relatively pure aluminum metal.

In summary, and recapitulating to some extent, the system of the present invention may be adapted for a wide variety of different energy management programs. First, the system may be utilized to store energy in a convenient, durable and non-contaminating form, i.e. metallic aluminum. The storage aspect of the cycle may involve simple local storage to adjust off-peak or seasonal energy demands. Alternatively, storage of energy in accordance with the present invention might enable a convenient emergency reserve or simply a convenient backlog of energy.

In addition to the facility for storage, the system of the present invention also accommodates the safe and convenient transportation of energy in the form of metallic aluminum. Specifically, as explained in some detail above, this system might be used with various sources of electrical energy located either in the proximity of energy sources or in acceptable environments. With the conversion of such available energy to metallic aluminum as the storage medium, the energy can be safely transported without endangering sensitive environments. Thus, the system of the present invention may be effectively employed in a wide variety of different applications to accomplish somewhat different objectives. However, in that regard, it is to be appreciated that the system as presented herein is merely an illustrative embodiment deemed best for present purposes; however, recognizing that the scope hereof shall be in accordance with the claims as set forth below.

What is claimed is:

1. A closed-loop process for managing electrical energy in displaced time or space, comprising the steps of:
    at a desired location or time for the provision of energy, igniting metallic electrolytically produced aluminum to combustion so as to produce heat of combustion and aluminum oxides;
    converting said heat of combustion from said metallic electrolytically produced aluminum to electrical energy for convenient use at said desired location or time; and
    at a different location or at a subsequent time, utilizing conveniently available electrical energy to electrolytically reduce said aluminum oxides to metallic aluminum for storage or transportation to a desired location or time of convenient use.

2. A process according to claim 1 wherein said step of electrolytically reducing said aluminum oxides comprises the chloride method of aluminum reduction.

3. A process according to claim 1 wherein said step of electrolytically reducing said aluminum oxides comprises nuclear techniques for the generation of electrical energy.

4. A process according to claim 3 wherein said step of reducing further comprises a chloride method of aluminum reduction.

5. A process according to claim 1 wherein said step of electrolytically reducing said aluminum oxides comprises the hydroelectric methods for the generation of electrical energy.

6. A process according to claim 1 further including the step of transporting said metallic aluminum to a desired location.

7. A process according to claim 1 wherein said step of igniting said aluminum is performed on molten aluminum.

8. A process according to claim 1 wherein said step of igniting said aluminum is performed on finely divided aluminum.

* * * * *